(12) United States Patent
Larn

(10) Patent No.: US 7,094,087 B2
(45) Date of Patent: Aug. 22, 2006

(54) AUDIO/VIDEO PLUG DETECTING APPARATUS AND METHOD THEREOF

(75) Inventor: Jen-Hong Larn, Taipei (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 11/018,254

(22) Filed: Dec. 22, 2004

(65) Prior Publication Data

US 2005/0142916 A1 Jun. 30, 2005

(30) Foreign Application Priority Data

Dec. 24, 2003 (TW) .............................. 92136776 A

(51) Int. Cl.
*H01R 29/00* (2006.01)
(52) U.S. Cl. ......................... 439/188; 381/58
(58) Field of Classification Search ................ 439/188, 439/944, 668–669; 200/51.09; 381/56, 381/58, 123
See application file for complete search history.

(56) References Cited

U.S. PATENT DOCUMENTS

| 5,550,755 A | * | 8/1996 | Martin et al. .......... 340/825.36 |
| 6,069,960 A | * | 5/2000 | Mizukami et al. ............ 381/74 |
| 2004/0264703 A1 | * | 12/2004 | Fujita ............................ 381/1 |

* cited by examiner

*Primary Examiner*—Briggitte Hammond
*Assistant Examiner*—X. Chung-Trans
(74) *Attorney, Agent, or Firm*—Rabin & Berdo, P.C.

(57) ABSTRACT

An audio/video plug detecting apparatus and the method thereof applied in an audio/video apparatus is provided. The audio/video apparatus for outputting a plurality of audio/video signals comprises a plurality of includes multiple contact sections. The detecting apparatus comprises includes a jack for accommodating the audio/video plug, a section number detector for detecting the number of the contact sections, a controller for determining a plurality of multiple possible output arrangements according to the number of the contact sections, and a display circuit for displaying the possible output arrangements in a menu from which where the user selects an active output arrangement from.

20 Claims, 3 Drawing Sheets

|   | OP1 | OP2 | OP3 |
|---|-----|-----|-----|
| 1 | L   | R   | TV  |
| 2 | R   | L   | TV  |
| 3 | TV  | L   | R   |
| 4 | L   | TV  | R   |
| 5 | TV  | R   | L   |
| 6 | R   | TV  | L   |

|   | OP1 | OP2 | OP3 |
|---|-----|-----|-----|
| 1 | L   | R   |     |
| 2 | R   | L   |     |
| 3 | TV  | L   | GND |
| 4 | L   | TV  |     |
| 5 | TV  | R   |     |
| 6 | R   | TV  |     |

|   | OP1 | OP2 | OP3 |
|---|-----|-----|-----|
| 1 | L   | R   | TV  |
| 2 | R   | L   | TV  |
| 3 | TV  | L   | R   |
| 4 | L   | TV  | R   |
| 5 | TV  | R   | L   |
| 6 | R   | TV  | L   |

FIG. 3A

|   | OP1 | OP2 | OP3 |
|---|-----|-----|-----|
| 1 | L   | R   |     |
| 2 | R   | L   |     |
| 3 | TV  | L   | GND |
| 4 | L   | TV  |     |
| 5 | TV  | R   |     |
| 6 | R   | TV  |     |

FIG. 3B

AUDIO/VIDEO PLUG DETECTING APPARATUS AND METHOD THEREOF

This application claims the benefit of Taiwan application Serial No. 92136776, filed Dec. 24, 2003, the subject matter of which is incorporated herein by reference.

BACKGROUND OF THE INVENTION

1. Field of the Invention

The invention relates in general to a plug detecting apparatus and the method thereof, and more particularly to an audio/video plug detecting apparatus and the method thereof.

2. Description of the Related Art

Along with the continual renovation in science and technology, various audio/video apparatuses are developed to satisfy consumers' needs in their work or entertainment. Examples of audio/video apparatus are the DVD player, VCD player, digital camera, digital video recorder, CD player or MP3 player.

For example, some of the digital cameras have an audio/video output jack for outputting images and sounds. After an audio/video plug coupled to an external TV has been loaded into the jack of the digital camera, the photos or video stored in the digital camera can be displayed on the external TV for the convenience of the user's viewing.

For example, the CD player has an audio output jack for outputting audio signals through a left sound channel or a right sound channel. An external speaker or headset receives the audio signals via an audio plug coupled to the jack of the CD player. The above examples show that the output specifications for the jacks used in various audio/video apparatuses are different.

FIG. 1A and FIG. 1B are schematic diagrams of an audio/video plug. FIG. 1A is a schematic diagram of a three-sectional plug. Three-sectional plug 10 includes two contact sections 11 and 13 disposed at the front end of the plug and a contact section 15 disposed at the rear end of the plug, wherein the contact sections are separated by isolation sections 12 and 14. While the three-sectional plug 10 is used in the CD player, the three contact sections 11, 13 and 15 are for receiving the left sound channel signals and the right sound channel signals and for grounding, respectively. While the three-sectional plug 10 is used in the digital camera, the three contact sections 11, 13, 15 are probably arranged for receiving a single sound channel signal and a video signal and for grounding, respectively.

FIG. 1B is a schematic diagram of a four-sectional plug. Four-sectional plug 20 includes contact sections 21 and 23 disposed at the front end of the plug and contact sections 25 and 27 disposed at the rear end of the plug, wherein the contact sections are separated by isolation sections 22, 24 and 26. While the four-sectional plug 20 is used in the digital camera, the contact sections 21, 23, 25 and 27 are probably arranged for receiving left sound channel signals, right sound channel signals, and video signals and for grounding, respectively, or arranged in other ways.

However, users may easily get confused which audio/video apparatus should use which plug. As disclosed above, audio/video apparatuses of various kinds require plugs of various sections, and the definitions of contact sections are different from one plug to another. Consequently, the plug of one audio/video apparatus cannot be used in another audio/video apparatus. Since a user may have more than one audio/video apparatus, the large variety of plugs are quite confusing and are difficult to be replaced if misplaced.

SUMMARY OF THE INVENTION

It is therefore an object of the invention to provide an audio/video plug detecting apparatus and the method thereof used in an audio/video apparatus for detecting the number of sections of the plug and defining the arrangements of the signals outputted to the plug.

The invention achieves the above-identified object by providing an audio/video plug detecting apparatus and the method thereof applied in an audio/video apparatus. The audio/video apparatus for outputting a plurality of audio/video signals includes a plurality of contact sections. The detecting apparatus includes a jack for accommodating the audio/video plug, a section number detector for detecting the number of the contact sections, a controller for determining a plurality of possible output arrangements according to the number of the contact sections, and a display circuit for displaying the possible output arrangements in a menu from which the user selects an active output arrangement.

According to another object of the invention, an audio/video plug detecting method applied in an audio/video apparatus is provided. The detecting method includes the following steps. First of all, detect whether an audio/video plug has been loaded. Next, determine the number contact sections of the audio/video plug. Following that, display a menu according to the number of the contact sections, wherein the menu includes a plurality of arrangement options of the audio/video signals, then the user selects an active output arrangement from the arrangement option. Lastly, output the audio/video signals to the audio/video plug according to the output arrangement.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 3A is a menu for a four-sectional plug; and

FIG. 3B is a menu for a three-sectional plug.

DETAILED DESCRIPTION OF THE INVENTION

Figure 1A:
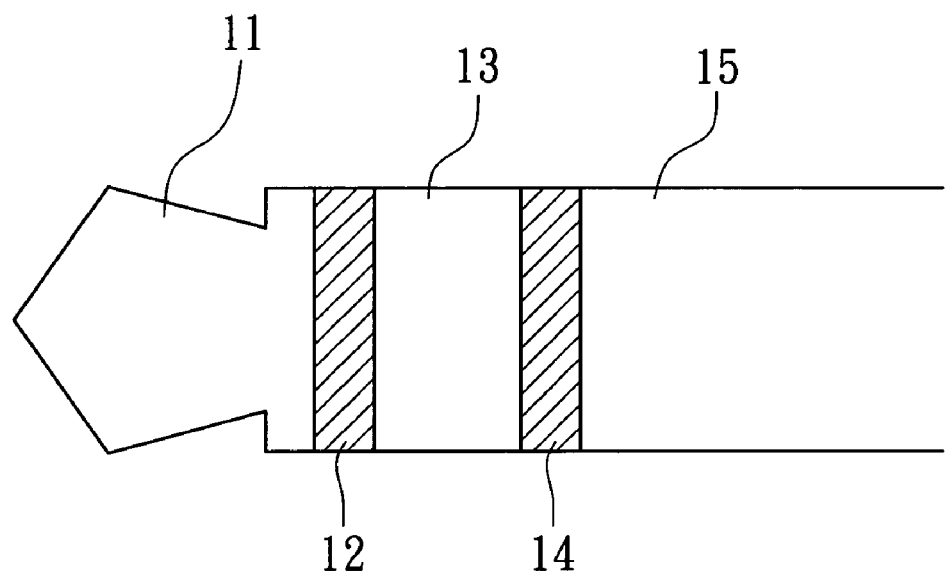
FIG. 1A and FIG. 1B are schematic diagrams of an audio/video plug.
Figure 1B:
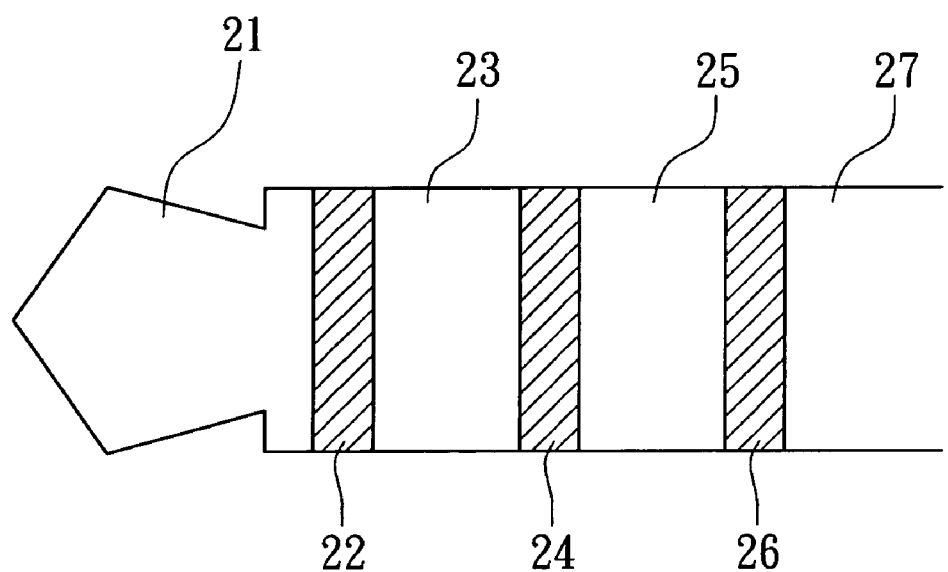
Figure 2:
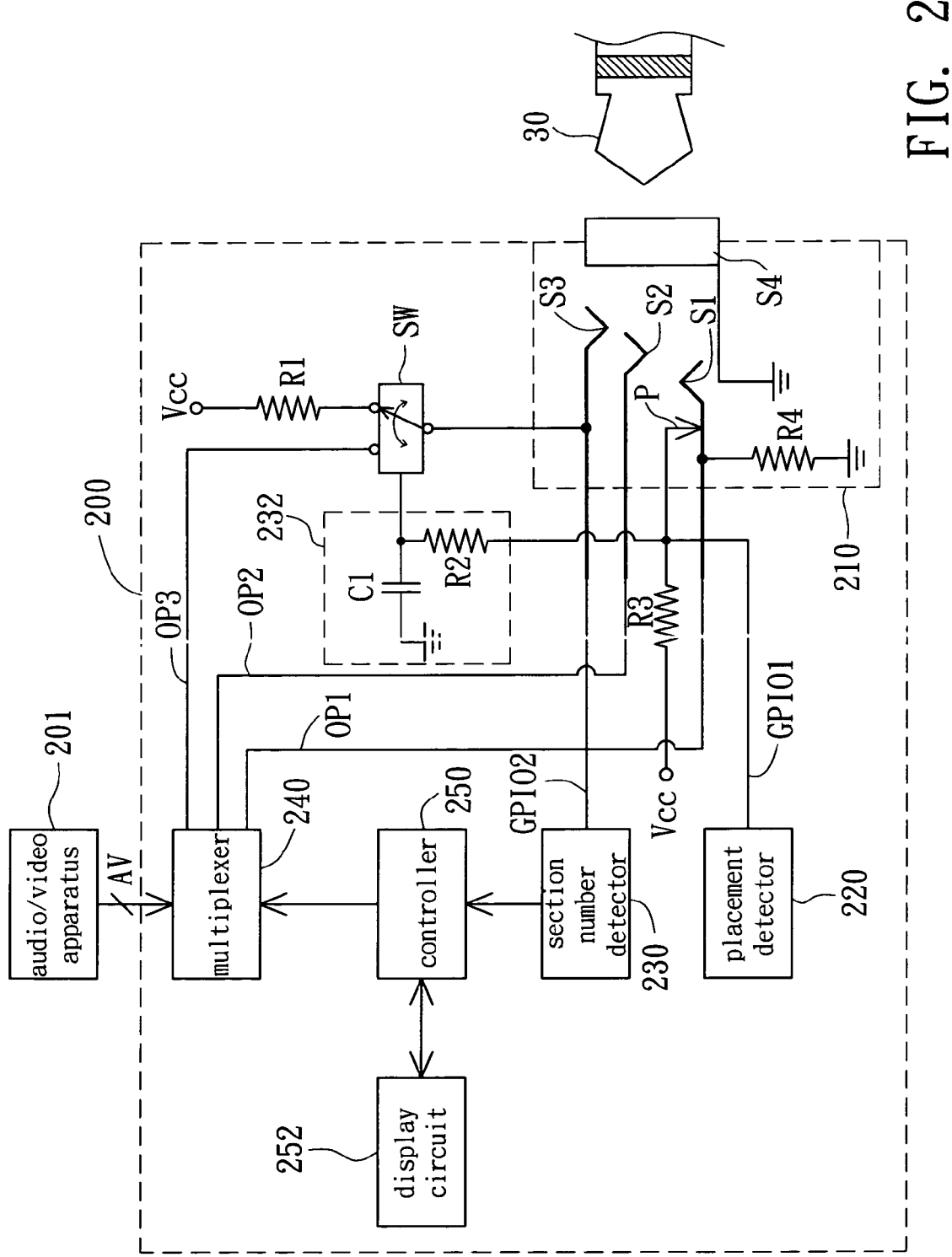
FIG. 2 is an audio/video plug detecting apparatus according to a preferred embodiment of the invention.

Referring to FIG. 2, an audio/video plug detecting apparatus according to a preferred embodiment of the invention is shown. Audio/video plug detecting apparatus 200 is disposed in an audio/video apparatus 201 for detecting the number of sections of an audio/video plug 30 and defining the signal sequence of the contact sections of the audio/video plug 30, wherein the audio/video plug 30 can be a three-sectional plug 10 in FIG. 1A or a four-sectional plug 20 in FIG. 1B for instance. The audio/video apparatus 201 is for outputting audio/video signals AV such as audio signals and visual signals for instance. The audio/video plug detecting apparatus 200 includes a jack 210, a placement detector 220, a section number detector 230, a power accumulator 232, a switch SW, a controller 250 and a multiplexer 240.

The jack 210 is for accommodating the audio/video plug 30. The placement detector 220 is for detecting whether the audio/video plug 30 has been loaded into the jack 210. The section number detector 230 determines the number of the contact sections of the audio/video plug 30 after the audio/video plug 30 has been loaded into jack 210. The controller 250 provides a menu from which the user selects an active output arrangement for the plug 30 such that the multiplexer 240 outputs signals correspondingly.

The jack 210 includes metal pieces S1, S2, S3 and a jack frame S4, wherein each of the metal pieces has a contact point, after the audio/video plug 30 loaded into jack 210, each of the contact points and the jack frame S4 is electrically connected with a contact section of the audio/video plug 30. The jack frame S4 is grounded. The metal piece S1 is grounded via a resistor R4. Before the audio/video plug 30 is loaded into the jack 210, metal pieces S1 is electrically connected with power source Vcc via a resistor R3 and a contact pin P. Meanwhile, the signals on the contact pin P are at a low level due to the voltage dividing circuit of the resistors R3 and R4.

After the audio/video plug 30 loaded into the jack 210, the audio/video plug 30 presses the metal pieces S1 downward so as to separate the metal pieces S1 from the contact pin P so that the contact pin P are at a high electric potential. The placement detector 220 uses a pin GPIO1 to electrically connect the contact pin P and determines whether the audio/video plug 30 has been loaded into the jack 210 according to the electric potential on contact pin P.

When the audio/video plug 30 is detected to be placed in the jack 210 by the placement detector 220, the detecting apparatus begins to detect the number of the contact sections of the audio/video plug 30. The present preferred embodiment is exemplified by three-sectional or four-sectional audio/video plug 30. It can be seen from the plug in FIG. 1A and FIG. 1B that the rear end of a three-sectional plug has one contact section, while the rear end of a four-sectional plug has two contact sections. So, the number of sections of a plug can be obtained by detecting whether a short-circuit occurs in the neighbor of the rear end of the plug. The switch SW is for controlling the electrical connection to the metal piece S3 and the resistor R1 or to the audio/video signal line OP3. In the initial status, the switch SW electrically connects the metal piece S3 with the resistor R1. If the audio/video plug 30 is the three-sectional plug 10, the metal piece S3 and the jack frame S4 are electrically connected with the contact section 15 of the plug 10 at the same time, while the jack frame S4 is grounded, so that the electric potential on the metal piece S3 is at a low level as well. If the audio/video plug 30 is the four-sectional plug 20, the metal piece S3 and the jack frame S4 are electrically connected with contact sections 25 and 27 respectively, so that the electric potential on the metal piece S3 is at a high level due to the power source Vcc and the resistor R1. The section number detector 230 uses a pin GPIO2 to electrically contact the metal piece S3 and determines the number of the contact sections according to the electric potential on pin GPIO2.

The power accumulator 232 controls the switch SW: when the output of the power accumulator 232 is at a low level, the switch SW enables the electrical connection between the metal piece S3 and the resistor R1; when the output of the power accumulator 232 is at a high level, the switch SW enables the electrical connection between the metal piece S3 and the audio/video signal line OP3. The power accumulator 232 is electrically connected with the contact pin P. Before the plug is loaded into the jack 210, the contact pin P is at a low electric potential, so the power accumulator 232 has not yet started charging. After the plug has been loaded into the jack 210, the contact pin P is at a high electric potential, so the power accumulator 232 starts charging. Initially, the output of the power accumulator 232 is at the low level such that the metal piece S3 connected to the voltage source Vcc by the switch SW, and so as to let the section number detector 230 detect the number of contact sections of the plug 30. After a period of time, the power accumulator 232 has been charged enough to switch the switch SW, the switch SW makes the audio/video signal line OP3 and the metal piece S3 electrically connected. That period of time is determined according to the resistors R2, R3 and the capacitor C1.

After the plug 30 is loaded into the jack 210 and the number of the contact sections is detected, the detecting apparatus 200 starts to decide the output arrangement of the audio/video signals. The controller 250 obtains the number of sections of the audio/video plug 30 from the section number detector 230 and accordingly displays a menu for the user to select an active output arrangement. The menu is shown in FIG. 3A and FIG. 3B. FIG. 3A shows a menu for a four-sectional plug. The three output signals, the left sound channel output signal L, the right sound channel output signal R and the video output signal TV, create six possible output arrangements. FIG. 3B shows a menu for a three-sectional plug. The three-sectional plug can only output two kinds of signals, i.e., either two sound channel signals or one sound channel signal plus one video signal. Totally, six possible output arrangements are created. According to the number of sections of the audio/video plug 30, the controller 250 outputs a plurality of possible output arrangements to the display circuit 252 so as to display a menu for the user to select. The user can select an option most suitable to the audio/video plug at hand from the menu as the active output arrangement, and then the multiplexer 240 will output the output signal AV of the audio/video apparatus 201 according to the selected active output arrangement via the signal lines OP1, OP2 and OP3.

When the audio/video apparatus 201 is a digital camera, the display can be the screen of the digital camera, wherein the provided menu can be displayed on the screen of the digital camera for the user to select. Even if the image apparatus 210 of the present detecting apparatus does not have a screen where the menu can be displayed, the selection still can be done via buttons.

The present preferred embodiment uses the jack frame S4 as a grounding end for exemplification. However, any one of the metal pieces S1 to S3 can also be used as a grounding end, the method thereof similar to that disclosed in the present preferred embodiment still follows the spirit of the invention and is not repeated here.

The audio/video plug detecting apparatus disclosed as the above preferred embodiment according to the invention enables an audio/video apparatus to be adaptable to various audio/video plugs. The user can use a currently available audio/video plug to output the signals of the audio/video apparatus to an external TV or speaker without being restrained to use the plug specified by the audio/video apparatus.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An audio/video plug detecting apparatus applied in an audio/video apparatus, wherein the audio/video apparatus outputs a plurality of audio/video signals, the audio/video plug comprises a plurality of contact sections, and the detecting apparatus comprises:

a jack for accommodating the audio/video plug;
a placement detector for detecting whether the audio/video plug has been loaded into the jack;
a section number detector for detecting the number of the contact sections of the audio/video plug;
a controller for determining a plurality of possible output arrangements according to the detected number of the contact sections, wherein the possible output arrangements define different arrangements of the audio/video signals to be outputted selectively to the contact sections of the audio/video plug; and
a display circuit for displaying a menu of the possible output arrangements on the audio/video apparatus for selection of one of the possible output arrangements as an active output arrangement from the menu so that the audio/video signal are outputted to the contact sections of the audio/video plug via the jack according to the active output arrangement.

2. The detecting apparatus according to claim 1, wherein the detecting apparatus further comprises a multiplexer, which outputs the audio/video signals to the audio/video plug via the jack according to the active output arrangement.

3. The detecting apparatus according to claim 2, wherein the jack comprises a first contact point, a second contact point, a third contact point and a fourth contact point, which is a grounding end;
wherein when the audio/video plug is not loaded into the jack, the electric potential on the first contact point is at a first level, whereas when the audio/video plug is loaded into the jack, the electric potential on the first contact point changes to a second level;
wherein the contact sections of the audio/video plug are electrically connected with the first to the fourth contact points respectively.

4. The detecting apparatus according to claim 3, further comprising a switch electrically connected with the third contact point, wherein before the audio/video plug is loaded into the jack, the switch couples the third contact point with a power source.

5. The detecting apparatus according to claim 4, wherein after the audio/video plug has been loaded into the jack, the section number detector checks whether the third contact point has the same electric potential with the fourth contact point: if so, the audio/video plug is a three-sectional plug, otherwise, the audio/video plug is a four-sectional plug.

6. The detecting apparatus according to claim 4, wherein after the section number detector has finished detection, the switch switches the third contact point to be coupled with the multiplexer.

7. The detecting apparatus according to claim 6, wherein the switch is controlled by a power accumulator, after the audio/video plug has been loaded into the jack, the power accumulator starts charging, after a period of time, the voltage of the power accumulator raises up so as to turn off the switch.

8. An audio/video plug detecting method applied in an audio/video apparatus, the audio/video apparatus having a plurality of contact sections for outputting a plurality of audio/video signals, the detecting method comprising:
detecting whether the audio/video plug has been loaded;
determining the number of the contact sections of the audio/video plug;
displaying a menu according to the determined number of the contact sections, wherein the menu comprises a plurality of possible output arrangement options of the audio/video signals for a user to select an active output arrangement from the possible output arrangement options, wherein the possible output arrangement options correspond to different arrangements of the audio/video signals to be outputted selectively to the contact sections of the audio/video plug; and
outputting the audio/video signals to the audio/video plug according to the active output arrangement.

9. The detecting method according to claim 8, wherein step of determining the number of the sections of the plug comprises:
determining whether a short-circuit occurs in the neighborhood of the rear end of the audio/video plug: if so, the plug is a three-sectional plug, otherwise, the plug is a four-sectional plug.

10. A detecting apparatus applied in an audio/video apparatus, wherein the audio/video apparatus can output a plurality of audio/video signals to a first audio/video plug comprising three contact sections or a second audio/video plug comprising four contact sections, while the detecting apparatus comprises:
a jack for accommodating either of the first audio/video plug and the second audio/video plug;
a section number detector for detecting the number of the contact sections of an active audio/video plug connected with the jack, wherein the active audio/video plug is either the first audio/video plug or the second audio/video plug;
a controller for determining a plurality of possible output arrangements according to the detected number of the contact sections, wherein the possible output arrangements define different arrangements of the audio/video signals to be outputted selectively to the contact sections of the active audio/video plug; and
a display circuit for displaying a menu showing the possible output arrangements on the audio/video apparatus for selection of an active output arrangement from the possible output arrangements so that the audio/video signal are outputted to the contact sections of the active audio/video plug via the jack according to the active output arrangement.

11. The detecting apparatus according to claim 10, wherein the detecting apparatus further comprises a multiplexer, which outputs the audio/video signals to the active audio/video plug via the jack according to the active output arrangement.

12. The detecting apparatus according to claim 11, wherein the jack comprises a first contact point, a second contact point, a third contact point and a fourth contact point, which is a grounding end;
wherein before the active audio/video plug is loaded into the jack, the electric potential on the first contact point is at a first level, whereas when the active audio/video plug is loaded into the jack, the electric potential on the first contact point changes to a second level;
wherein the contact sections of the active audio/video plug are electrically connected with the first to the fourth contact points of the jack respectively.

13. The detecting apparatus according to claim 12, further comprising a switch electrically connected with the third contact point, wherein before the active audio/video plug is loaded into the jack, the switch couples the third contact point with a power source.

14. The detecting apparatus according to claim 13, wherein after the active audio/video plug has been loaded into the jack, the section number detector checks whether the third contact point has the same electric potential with the fourth contact point: if so, the active audio/video plug is the first audio/video plug, otherwise, the audio/video plug is the second audio/video plug.

15. The detecting apparatus according to claim 14, wherein after the section number detector has finished detection, the switch switches the third contact point to be coupled with the multiplexer.

16. The detecting apparatus according to claim 15, wherein the switch is controlled by a power accumulator, after the audio/video plug has been loaded into the jack, the power accumulator starts charging, after a period of time, the voltage of the power accumulator raises up so as to switch off the switch.

17. The detecting apparatus according to claim 11, wherein:
   the jack comprises a plurality of contact points;
   the detecting apparatus further comprises a switch coupled to a first one of the contact points, wherein the switch couples the first one of the contact points to a specific voltage before the audio/video plug is loaded into the jack; and
   the section number detector checks whether the first one of the contact points has the same voltage with another one of the contact points adjacent to the first one after the audio/video plug has been loaded into the jack, so as to determine the number of contact sections of the audio/video plug.

18. The detecting apparatus according to claim 17, further comprising a power accumulator for controlling the switch, wherein after the audio/video plug has been loaded into the jack, the power accumulator starts charging, after a period of time, the voltage of the power accumulator raises up so as to control the switch to couple the first one of the contact points to the multiplexer.

19. The detecting apparatus according to claim 11, wherein:
   the jack comprises a plurality of contact points corresponding to the contact sections of the audio/video plug;
   the detecting apparatus further comprises a switch coupled to a first one of the contact points, wherein the switch couples the first one of the contact points to a specific voltage before the audio/video plug is loaded into the jack; and
   the section number detector checks whether the first one of the contact points has the same voltage with another one of the contact points adjacent to the first one after the audio/video plug has been loaded into the jack, so as to determine the number of contact sections of the audio/video plug.

20. The detecting apparatus according to claim 19, further comprising a power accumulator for controlling the switch, wherein after the audio/video plug has been loaded into the jack, the power accumulator starts charging, after a period of time, the voltage of the power accumulator raises up so as to control the switch to couple the first one of the contact points to the multiplexer.

* * * * *